(12) United States Patent
Magyar et al.

(10) Patent No.: US 7,558,043 B2
(45) Date of Patent: Jul. 7, 2009

(54) AMPERAGE CONTROL FOR VALVES (75) Inventors: Robert J. Magyar, Grove Village, IL (US); Michael A. Niemiro, Plainfield, IL (US)

(73) Assignee: Technotrans America, Inc., Wheeling, IL (US)

( * ) Notice: Subject to any disclaimer, the term of this patent is extended or adjusted under 35 U.S.C. 154(b) by 0 days.

(21) Appl. No.: 10/667,257

(22) Filed: Sep. 19, 2003

(65) Prior Publication Data

US 2004/0130845 A1    Jul. 8, 2004

Related U.S. Application Data

(60) Provisional application No. 60/412,508, filed on Sep. 20, 2002.

(51) Int. Cl.
*H01H 9/00* (2006.01)
(52) U.S. Cl. ...................... 361/152; 361/154
(58) Field of Classification Search ........... 361/139, 361/140, 143, 153, 154, 160, 161, 166, 152; 123/90.11
See application file for complete search history.

(56) References Cited

U.S. PATENT DOCUMENTS

| | | | |
|---|---|---|---|
| 5,450,270 A * | 9/1995 | Takahashi | .............. 361/154 |
| 5,523,682 A | 6/1996 | Leon | |
| 5,578,904 A | 11/1996 | Marcott | |
| 5,812,355 A * | 9/1998 | Nojima | .............. 361/152 |
| 5,942,892 A | 8/1999 | Li | |
| 6,061,225 A * | 5/2000 | Nojima | .............. 361/160 |
| 6,380,861 B2 * | 4/2002 | Estelle et al. | .............. 340/588 |
| 6,571,823 B2 | 6/2003 | Rossi | |
| 6,690,563 B2 * | 2/2004 | Ozawa et al. | .............. 361/154 |
| 6,757,149 B2 * | 6/2004 | Moran | .............. 361/160 |
| 6,766,789 B2 * | 7/2004 | Yamakado et al. | .......... 123/490 |
| 6,845,300 B2 * | 1/2005 | Haghgooie et al. | .......... 700/289 |
| 6,978,978 B2 * | 12/2005 | Near | .............. 251/129.05 |

OTHER PUBLICATIONS

International Search Report
International Search Report includes U.S. 5523682, 6571823, 5942892 and 5578906, Nov. 17, 2003.

* cited by examiner

*Primary Examiner*—Brian Sircus
*Assistant Examiner*—Danny Nguyen
(74) *Attorney, Agent, or Firm*—Patti, Hewitt & Arezina LLC (57) ABSTRACT

An amperage control for an electrically operated valve having a coil. A process control apparatus generates a plurality of electrical operating data signals, each signal corresponding to an operating parameter of the valve. A valve control apparatus transmits voltage to the coil of the valve to control the operation of the valve, the valve control apparatus receiving at least one operating data signal generated by the process control apparatus. A current flow is created in the coil of the valve upon receiving voltage from the valve control apparatus. A current senses the flow of current in the electrically controlled valve, and creates an electrical signal responsive to the current flow in the coil of the valve. When the signal created by the current sensing apparatus is applied to the valve control apparatus, the valve control apparatus modifies the operation of the valve responsive to the signal created by the current sensing apparatus.

19 Claims, 5 Drawing Sheets

Figure 1:
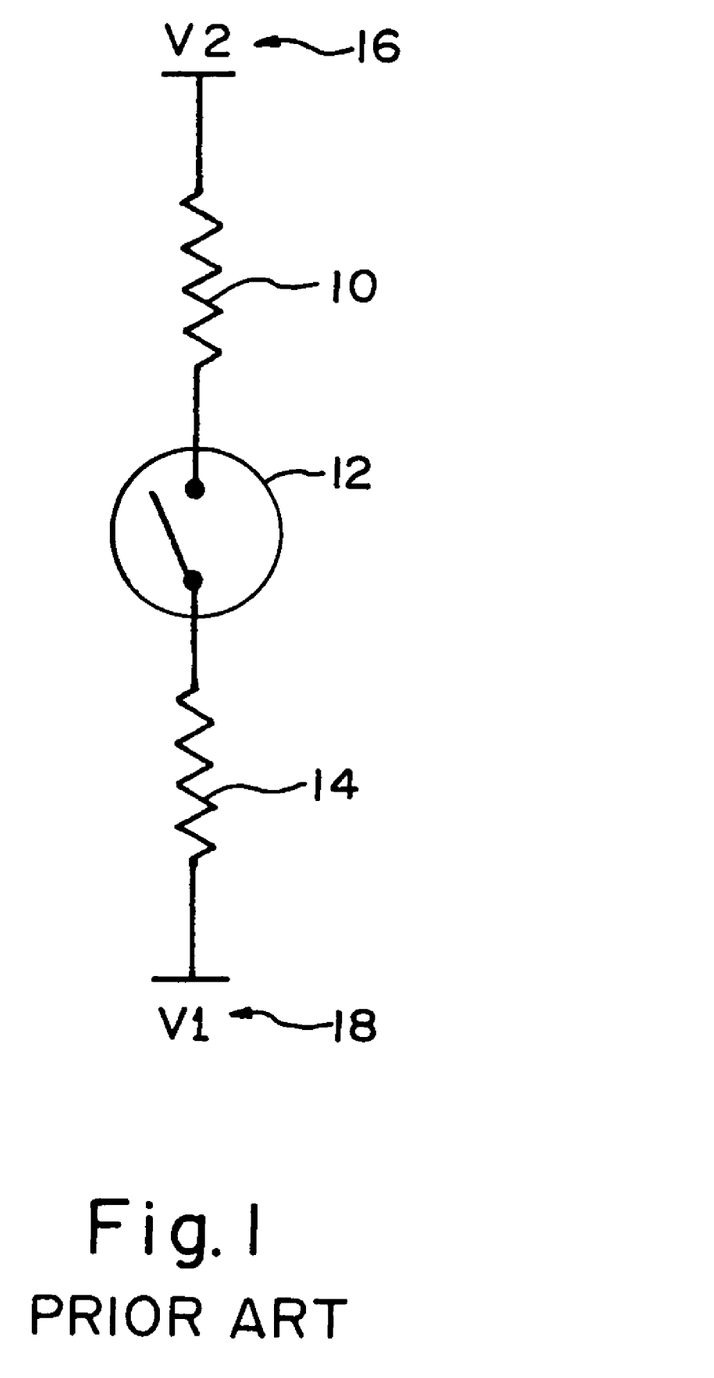
FIG. 1 is a schematic illustration of the voltage control circuit for a solenoid operated valve found in the prior art.
Figure 2:
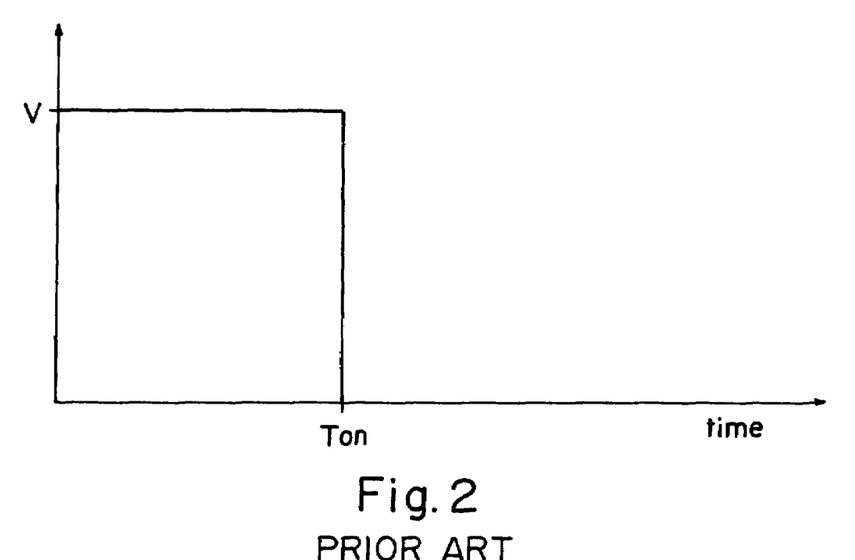
FIG. 2 is a time-voltage curve reflecting the prior art operation of the circuit of FIG. 1 in a conventional on-off manner.

Fig. 8 ately ends of the circuit, 16, 18. Included in the schematic shown in FIG. 1 is parasitic impedance 14 introduced by connectors, long wire length, and other various electrical anomalies found in an actual application resulting in a voltage drop $V_p$. When the valve is to be engaged, the transistor switch 12 is closed, applying the voltage $[V_2-V_1-V_P]$ across load 10. $V_1$ is the ground voltage and $V_2$ is the positive voltage and $V_P$ is the loss

AMPERAGE CONTROL FOR VALVES

REFERENCE TO PROVISIONAL APPLICATION

Applicants claim priority based upon their provisional U.S. Patent Application Ser. No. 60/412,508, filed Sep. 20, 2002.

FIELD OF THE INVENTION

This invention relates to an amperage control for valves, and in particular for operating unipolar and bipolar rapid on-off valves adapted for use in a spray dampening system of a rotary printing press.

BACKGROUND OF THE INVENTION

Contemporary spray dampening control systems such as used in rotary printing presses utilize voltage as the source of electromagnetic energy to drive valves. For sake of simplicity, only a discussion of a unipolar valve is given. Bipolar counterpart valves have an additional stage which is conceptually identical, but opposite in polarity. For a description of unipolar versus bipolar operation, refer to our concurrently filed application entitled "Bistable Converter in a Spray Dampening System."

Referring to FIG. 1, the most basic, and the most prevalent form of current technology consists of a load 10 comprising the solenoid coil of a valve, electrically connected in series with one or more transistors 12 acting as a switches. Opposing voltage potentials $V_1$, $V_2$ are applied to opposite of voltage across impedance 14, which is inherent in all voltage control systems. The voltage across the load allows current to flow through the load according to Ohms Law, V=IR, where load 10 provides the resistance R. This current 12 generates a magnetic field, which actuates the valve. When the transistor switch 12 is opened, the flow of current stops, and the valve becomes de-energized.

Three types of voltage control systems have been offered in the prior art. They are conventional, step voltage, and pulse width modulated (PWM) voltage control techniques.

Conventional

The most widespread application is one where the solenoid device is activated by closing a switch. The solenoid device is deactivated by opening the switch, thus removing the voltage placed across the solenoid. In a unipolar solenoid valve, a mechanical device such as a spring returns the valve to its normal, de-energized state.

Step Voltage

A solenoid valve requires far more energy to open, than to remain open. There have been designs which deliver a higher "open" voltage to move the mechanical actuator to an "open" position (see FIG. 3). This is followed by a less intense "hold" voltage to ensure that the actuator remains "open" for the desired interval.

Pulse Width Modulated (PWM) Voltage

Figure 3:
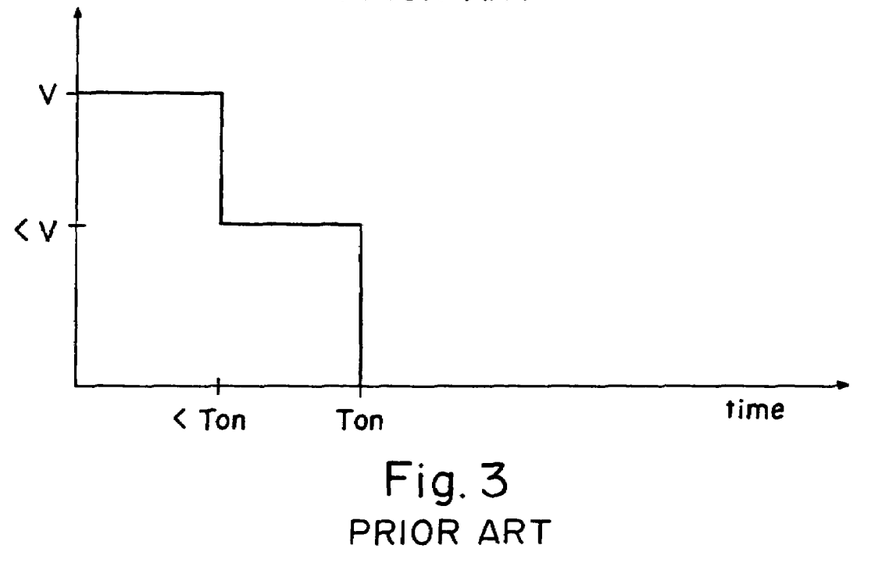
FIG. 3 is a time-voltage curve reflecting the prior art step voltage operation of the circuit of FIG. 1.
Figure 4:
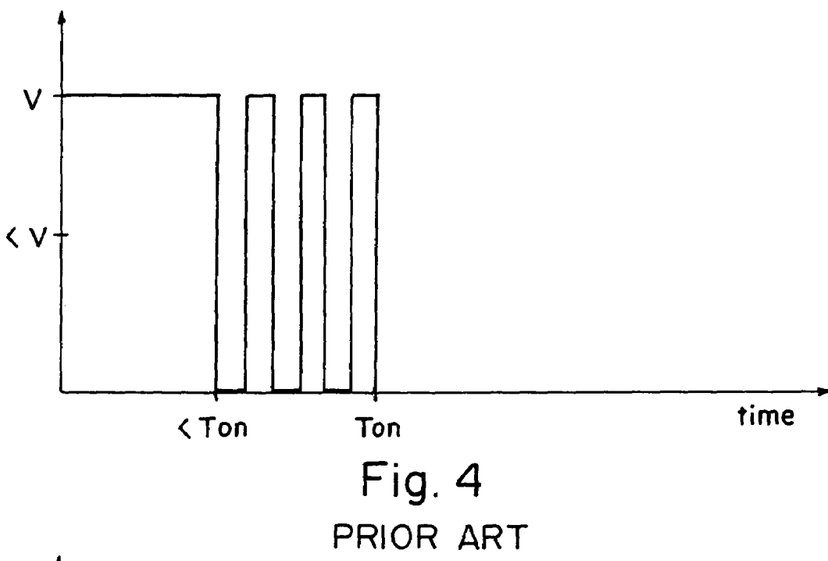
FIG. 4 is a time-voltage curve reflecting the prior art pulse width modulated voltage (PWM) operation of the circuit of FIG. 1.

For the same purpose as the "step voltage" system shown in FIG. 3, the PWM system uses full voltage for the "open" interval. Afterward the full voltage is switched on and off at intervals, to create a lower average voltage for the "hold" interval, as shown in FIG. 4.

SUMMARY OF THE INVENTION

The amperage or electrical current control technique of the present invention employs circuitry which senses the current flowing through the load 10 (FIG. 1). As such, it is independent of applied voltage 16 so long as Ohms Law allows for the desired steady state current. The system can deliver any number of regulated current intervals of any magnitude, duration and polarity.

By directly manipulating the current in a solenoid valve control system rather than voltage, several benefits are realized. First, optimal accuracy and precision in the control of the valve is achieved. Magnetic force, like that used in solenoid valves, is generated by electrical current. A quick glance at any physics book reveals that, in the discussion of magnetism, the symbol for voltage ("V") is absent. Voltage is only indirectly involved in magnetism, in that it defines the maximum achievable current through a load according to Ohms Law. Direct, and regulated, control of electrical current results in the generation of magnetic fields which are more strictly controlled. Furthermore, many dynamic mechanical deficiencies reveal their presence by exerting an influence on the flow of current through the device. The amperage control system of the present invention self-adjusts, countering this type of induced and undesirable current activity. As a result, certain of these deficiencies are minimized or negated entirely. The outcome of using the current control system of the present invention is more predictable and more stable valve operation.

Second, the operation of current controlled valves becomes impervious to common electrical anomalies.

In actual application, a solenoid system is burdened by:
1. Voltage fluctuation,
2. Impedance variation due to conductor length or gauge,
3. Impedance variation due to contacts at connection points,
4. Impedance variation due to corrosion,
5. Impedance variation due to component variation, and
6. Impedance variation due to damage within the system Since the drive stage senses the current delivered to the load in the present invention, the system can react to all of the adverse conditions outlined above. Only a catastrophic situation could impair the performance of a feedback regulated current control system.

Third, the current control system of the present invention provides electrically operated valves with optimal transitional performance. The fastest transitional response is achieved through two mechanisms:
1. An over-current impulse, short in duration, can be delivered to the solenoid which far exceeds the maximum allowable steady-state power levels in both the load and the drive stage.
2. The rate at which steady state current is reached through an inductive load (as in a solenoid valve) is expressed by the equation $I(t)=[1/L]\cdot\int v(t)dt$, where I is current, t is time, L is load, and V is voltage. As such, voltage determines the rate at which current increases through the coil in a valve. Therefore, the rate at which a magnetic field is generated by a solenoid is proportional to the applied voltage. The amperage control technique is able to exploit this fact to the fullest extent. Voltage in such a system is only limited by the absolute maximum rating of the electrical components. The electrical current is precisely regulated by the control system. Therefore, a voltage may be applied that would normally generate a steady-state current far greater than the safe limit of the components. This maximizes the rate at which a magnetic field is generated in the valve. However, the current in the presently disclosed invention is limited to avoid exceeding maximum allowable power dissipation in the system.

Figure 5:
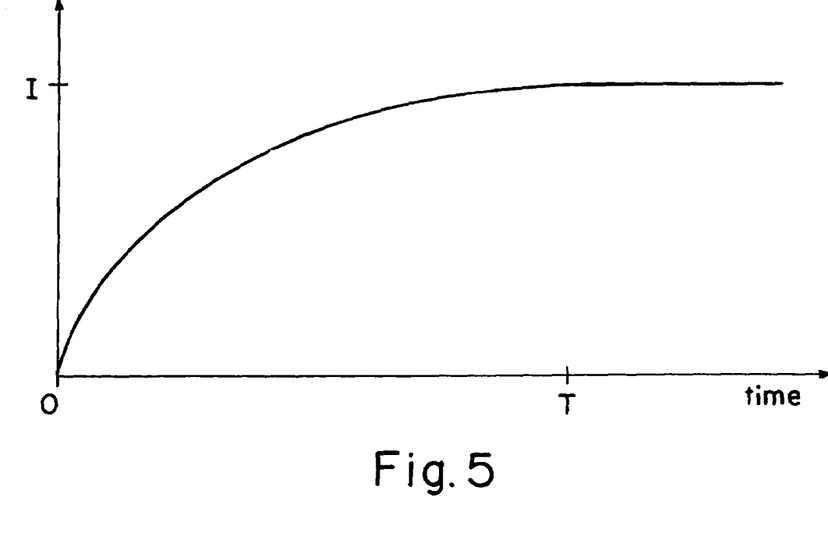
FIG. 5 is a time-current curve resulting from the application of a voltage V across an inductive load, showing that steady state current is ultimately achieved.

FIG. 5 is the step response of a voltage control system which applies voltage V across an inductive load at time t=0. After time T, a steady state current I is achieved.

Figure 6:
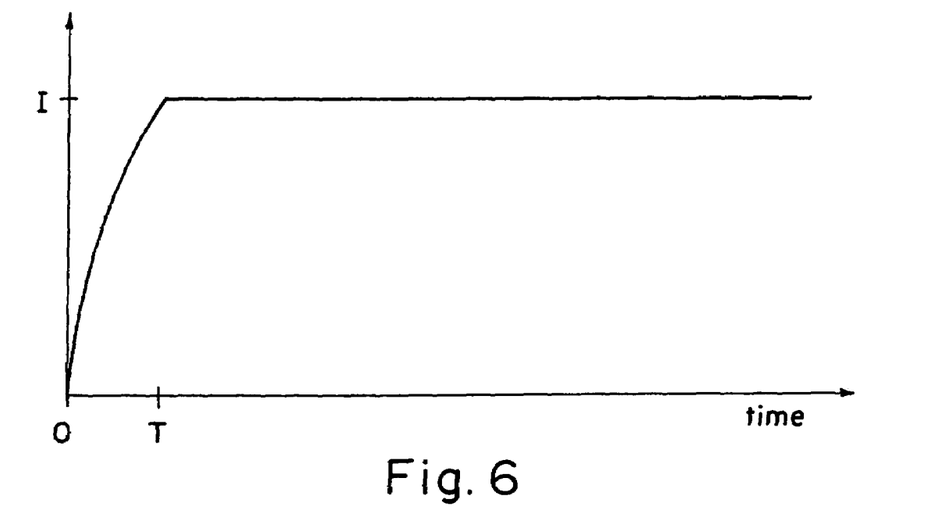
FIG. 6 is a time-current curve showing the step response of the current control system of the present invention.

FIG. 6 is the step response of a current control system which uses a much higher supply voltage. This system is designed to deliver current I across the same load as represented in FIG. 5. The current control system reaches steady state current much sooner, at which point the current is held constant.

DESCRIPTION OF THE ILLUSTRATED EMBODIMENT OF THE INVENTION

Figure 7:
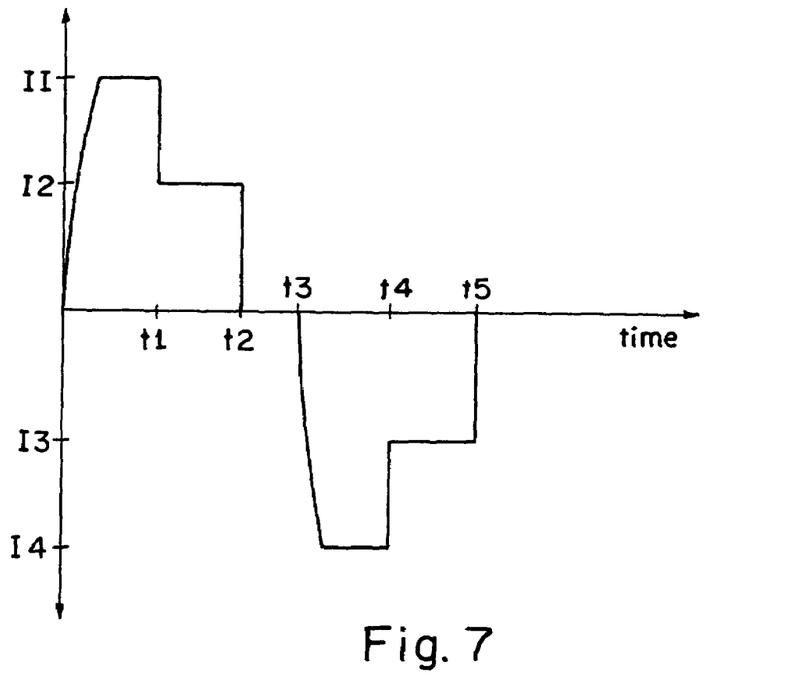
FIG. 7 illustrates the current waveform over time of one cycle delivered through a bipolar valve.

FIG. 7 displays the current waveform of one cycle of operation of the current control system of the present invention delivered through a bipolar valve. Phase t1 is an impulse current I1 delivered to set the valve actuator in motion. Phase t2 is a lower current I2 to stabilize the valve in an open state. Phase t3 is an electrically idle interval. Phase t3 exists to conserve energy, as well as to allow magnetic forces to dissipate prior to a following reverse condition. Phase t4 is an oppositely polarized current impulse I3 to set the valve into motion toward a closed state. The last phase applied is t5. Current level I4 stabilizes the valve in a closed state.

Schematic Diagram of Amperage Control Circuit

Figure 8:
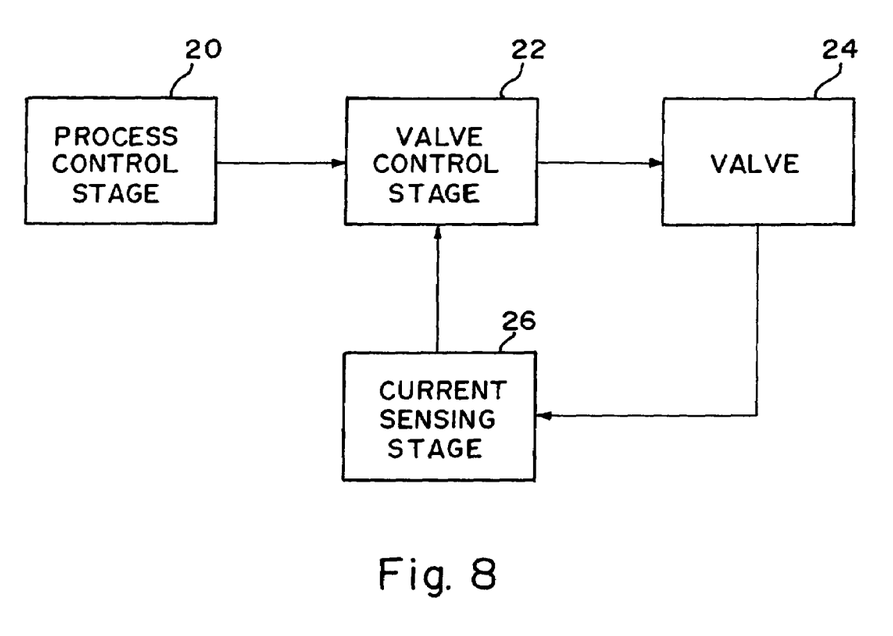
FIG. 8 is a schematic diagram of a current control valve operation system, including the current sensing stage of the present invention.

FIG. 8 is a schematic diagram of the structure of the amperage control circuit of the present invention as it pertains to one valve. Although there can be more valves, analysis of one valve is sufficient for one skilled in the art to apply the teaching of the present invention to multiple valves.

Process Control Stage

Referring to FIG. 8, the process control stage 20 constitutes the intelligence of the system, and can take the form of a PC, microprocessor, PLC, or as simple circuitry, which establishes a sequence that determines when the valve should open and close. All operating and control parameters (for example: valve open time, operating frequency, magnitude of current intervals, duration of current intervals, polarity of current intervals, duration of idle intervals and other operating parameters) are determined at and stored using the process control stage 20. The process control stage delivers instructions to the valve control stage 22, to determine when and how transitions at the valve 24 are to occur. In the illustrated embodiment of the invention, the process control stage 20 comprises microchip PIC18F242. However, other microchips may used. The process control stage 20 delivers operating data to the valve control stage 22 in the form of messages through a serial data interface.

Valve Control Stage

The valve control stage 22 comprises one or more components that directly control the valve 24. All operating data is received from the process control stage 20, and transformed into electrical signals applied to the electrical operating mechanism of the valve 24. The valve control stage 22, by way of illustrative example, comprises four Allegro A3973 dual DMOS full-bridge microstepping PWM motor drivers. A description of the Allegro DMOS A3973 can be found in Allegro Microsystems, Inc. Data Sheet No. 29319.34, "Dual DMOS FullBridge Microstepping PWM Motor Driver," Dec. 1, 2000, published by Allegro Microsystems, Inc., Worcester, Mass. 01615-0036, which description is incorporated herein by reference. In the case of an "open valve" operation, the A3973 receives data from microchip PIC18F242 to apply an "open" current with a defined magnitude. At the output terminals of the A3973, full supply voltage is delivered to the coil of the operator of valve 24. Current in the coil of valve 24 is monitored by the current sensing stage 26. Information regarding the detected current is sent back to the valve control stage, described below. When the desired current is detected, the valve control stage 26 reduces the average applied voltage. In this state, the valve control stage makes adjustments to the voltage applied to the coil of valve 24 based on the current detection feedback, maintaining a constant current output. The A3973 processor uses pulse width modulation to adjust the applied voltage to the operating coil of valve 24.

Current Sensing Stage

The current sensing stage 26 comprises one or more components that monitor the level of current flowing through the coil of the valve 24. In the presently described embodiment, this includes a small precision resistor in series with the coil of the valve 24. Current flowing through the valve operator coil also flows through this resistor, generating a small voltage drop. This voltage creates a feedback signal sent to the valve control stage 22, so that the valve control stage may make on-the-fly corrections to the current delivered to the operating coil of valve 24.

The data defining the valve operating parameters is transmitted to the valve driver A3973 (U2, FIG. 1) that is incorporated in the valve control stage 22. The data is transmitted across two conductors in the form of serial messages. Driver A3973 decodes these messages and executes their contents with an on-board processor. The processor aboard driver A3973 activates a DMOS transistor bridge to apply current to the coil in valve 24. The DMOS transistor bridge is described in the above-identified Allegro Microsystems, Inc. Data Sheet No. 29319.34. Current which runs through the coil of valve 24 also runs through a sense resistor. This current generates a voltage that provides control feedback to A3973. Driver A3973, as part of valve control stage 22, uses this feedback to make adjustments to maintain the desired current through the coil of valve 24.

While the specific invention has been described with particular emphasis on illustrated embodiments, it will be obvious to those of ordinary skill in the art that variations in the illustrated embodiment of the present invention may be used and that it is intended that the invention may be practiced otherwise than as specifically described herein. Accordingly, this invention includes all modifications encompassed within the spirit and scope of the invention as defined by the following claims.

We claim:

1. An amperage control for an electrically operated valve, comprising:
   a. a process control apparatus generating a plurality of electrical operating data signals, each signal corresponding to an operating parameter of the electrically operated valve;
   b. a valve control apparatus transmitting a voltage to the electrically operated valve to control the operation of the valve, the valve control apparatus receiving at least one operating data signal generated by the process control apparatus;
   c. the electrically controlled valve having a current flow created therein upon receiving the voltage from the valve control apparatus;
   d. a current sensing apparatus sensing the flow of current in said electrically controlled valve, said current sensing apparatus creating an electrical signal responsive to the current flow in said electrically controlled valve;
   e. said signal created by the current sensing apparatus applied to said valve control apparatus, said valve control apparatus control, the operation of said electrically controlled valve responsive to said signal created by the current sensing apparatus;
   a first impulse current, which is one of a number of regulated current intervals of the flow of current in said electrically controlled valve, delivered by the valve control apparatus to set the valve in motion toward an open state during a first time phase;
   a first low current, which is one of the regulated current intervals of the flow of current in said electrically controlled valve, delivered by the valve control apparatus to stabilize the valve in the open state during a second time phase, the first low current having a lower amplitude than an amplitude of the first impulse current;
   a substantially zero current, which is one of the regulated current intervals of the flow of current in said electrically controlled valve, delivered by the valve control apparatus for an electrically idle interval during a third time phase, to conserve energy, as well as to allow magnetic forces to dissipate prior to a following reverse condition;
   a second impulse current, which is one of the regulated current intervals of the flow of current in said electrically controlled valve and which is polarized oppositely to the first impulse current, delivered by the valve control apparatus to set the valve into motion toward a closed state during a fourth time phase; and
   a second low current, which is one of the regulated current intervals of the flow of current in said electrically controlled valve and which is polarized oppositely to the first low current, delivered by the valve control apparatus to stabilize the valve in the closed state during a fifth time phase, the second low current having a lower amplitude than an amplitude of the first impulse current.

2. The amperage control of claim 1, wherein the process control apparatus contains information that determines an open and closed sequence of the electrically controlled valve.

3. The amperage control of claim 1 wherein the valve control apparatus receives valve operating data from the process control apparatus and transforms said data into electrical signals applied to the electrically operated valve.

4. The amperage control of claim 2 wherein upon the detection of a predetermined current in the electrically controlled valve, the valve control apparatus reduces the voltage applied to the valve.

5. The amperage control of claim 1 wherein upon the detection of a predetermined current in the electrically controlled valve, the valve control apparatus adjusts the voltage applied to the electrically controlled valve responsive to said signal created by said current sensing apparatus.

6. The amperage control of claim 5 wherein the adjustment of the current applied to the electrically controlled valve maintains a constant current output in the valve.

7. The amperage control of claim 1 wherein the electrically controlled valve includes a coil, the current sensing apparatus comprises a resistor in series with the coil, and current passing through the resistor creates a voltage drop.

8. The amperage control of the claim 7 wherein the voltage drop provides a feedback signal that is transmitted to the valve control apparatus, the valve control apparatus adjusting the current delivered to the coil of the electrically controlled valve responsive to the feedback signal.

9. A method of controlling an operation of an electrically controlled valve comprising the steps of:
   a. creating a plurality of first electrical signals that correspond to at least one of the operation and control instructions for the electrically controlled valve;
   b. transforming said first electrical signals into a plurality of second electrical signals and transmitting said second electrical signals to the electrically controlled valve, creating an electrical current in the electrically controlled valve;
   c. sensing the current level in the electrically controlled valve and providing a third electrical signal responsive to said sensed current; and
   d. providing a current to the electrically controlled valve responsive to the third electrical signal, wherein the electrically controlled valve includes a coil, and step (e) comprises sensing the current level in the coil;
   steps a, b, c and d thereby effecting delivery of a first impulse current to set the valve in motion toward an open state during a first time phase, delivery of a first low current to stabilize the valve in the open state during a second time phase, the first low current having a lower amplitude than an amplitude of the first impulse current, delivery of a substantially zero current for an electrically idle interval during a third time phase to conserve energy, as well as to allow magnetic forces to dissipate prior to a following reverse condition, delivery of a second impulse current, which is polarized oppositely to the first impulse current, to set the valve into motion toward a closed state during a fourth time phase, and delivery of a second low current, which is polarized oppositely to the first low current, to stabilize the valve in the closed state during a fifth time phase, the second low current having a lower amplitude than an amplitude of the first impulse current.

10. The method of claim 9 wherein the first electrical signals establish a sequence that determines when the electrically controlled valve transitions between an open and closed position.

11. The method of claim 9 wherein the step of sensing the current level comprises the steps of:
   a. generating a voltage drop to create a feedback signal;
   b. applying the feedback signal to change the value of the current in the electrically controlled valve.

12. An apparatus, comprising:
a valve control stage operatively coupled to a coil of a solenoid actuator of a valve;
a current sensing stage operatively coupled to the coil of the solenoid actuator of the valve and to the valve control stage, current in the coil of the valve being monitored by the current sensing stage which sends data indicative thereof to the valve control stage;
a first impulse current, a first low current, a substantially zero current, a second impulse current, and a second low current supplied by the valve control stage to the coil of the solenoid actuator of the valve;
the first impulse current delivered to set the valve in motion toward an open state during a first time phase;
the first low current delivered to stabilize the valve in the open state during a second time phase, the first low current having a lower amplitude than an amplitude of the first impulse current;
the substantially zero current delivered for an electrically idle interval during a third time phase to conserve energy, as well as to allow magnetic forces to dissipate prior to a following reverse condition;
the second impulse current, which is polarized oppositely to the first impulse current, delivered to set the valve into motion toward a closed state during a fourth time phase; and
the second low current, which is polarized oppositely to the first low current, delivered to stabilize the valve in the closed slate during a fifth time phase, the second low current having a lower amplitude than an amplitude of the first impulse current.

13. The apparatus according to claim 12, wherein during the third time phase magnetic forces in the coil of the valve dissipate prior to a following reversing operation of the valve.

14. An apparatus comprising
a valve control stage operatively coupled to a coil of a solenoid actuator of a valve;
a current sensing stage operatively coupled to the coil of the solenoid actuator of the valve and to the valve control stage, current in the coil of the valve being monitored by the current sensing stage which sends data indicative thereof to the valve control stage;
a first impulse current, a first low current, a substantially zero current, a second impulse current, and a second low current supplied by the valve control stage to the coil of the solenoid actuator of the valve;
the first impulse current delivered to set the valve in motion toward an open state during a first time phase;
the first low current delivered to stabilize the valve in the open state during a second time phase, the first low current having a tower amplitude than an amplitude of the first impulse current;
the substantially zero current delivered for an electrically idle interval during a third time phase, to conserve energy, as well as to allow magnetic forces to dissipate prior to a following reverse condition;
the second impulse current, which is polarized oppositely to the first impulse current, delivered to set the valve into motion toward a closed state during a fourth time phase; and
the second low current, which is polarized oppositely to the first low current, delivered to stabilize the valve in the closed state during a fifth time phase, the second low current having a lower amplitude than an amplitude of the first impulse current.

15. The apparatus according to claim 14, wherein during the third time phase magnetic forces in the coil of the valve dissipate prior to a following operation of the valve.

16. An apparatus, comprising:
a spray dampening system of a rotary printing press having at least a valve control stage, a current sensing stage, and at least one valve;
the valve control stage operatively coupled to a coil of a solenoid actuator of the valve;
the current sensing stage operatively coupled to the coil of the solenoid actuator of the valve and to the valve control stage, current in the coil of the valve being monitored by the current sensing stage which sends data indicative thereof to the valve control stage;
a first impulse current, a first low current, a substantially zero current, a second impulse current, and a second low current supplied by the valve control stage to the coil of the solenoid actuator of the valve;
the first impulse current delivered to set the valve in motion toward an open state during a first time phase;
the first low current delivered to stabilize the valve in the open state during a second time phase, the first low current having a lower amplitude than an amplitude of the first impulse current;
the substantially zero current delivered for an electrically idle interval during a third time phase, to conserve energy, as well as to allow magnetic forces to dissipate prior to a following reverse condition;
the second impulse current, which is polarized oppositely to the first impulse current, delivered to set the valve into motion toward a closed state during a fourth time phase; and
the second low current, which is polarized oppositely to the first low current, delivered to stabilize the valve in the closed state during a fifth time phase, the second low current having a lower amplitude than an amplitude of the first impulse current.

17. The apparatus according to claim 16, wherein during the third time phase magnetic forces in the coil of the valve dissipate prior to a following operation of the valve.

18. The apparatus according to claim 16, wherein during the third time phase magnetic forces in the coil of the valve dissipate prior to a following operation of the valve.

19. An apparatus, comprising:
a spray dampening system of a rotary printing press having at least a valve control stage, a current sensing stage, and at least one valve;
the valve control stage operatively coupled to a coil of a solenoid actuator of the valve;
the current sensing stage operatively coupled to the coil of the solenoid actuator of the valve and to the valve control stage, current in the coil of the valve being monitored by the current sensing stage which sends data indicative thereof to the valve control stage;
a first impulse current, a first low current, a substantially zero current, a second impulse current, and a second low current supplied by the valve control stage to the coil of the solenoid actuator of the valve;
the first impulse current delivered to set the valve in motion toward an open state during a first time phase;
the first low current delivered to stabilize the valve in the open state during a second time phase, the first low current having a lower amplitude than an amplitude of the first impulse current;
the substantially zero current delivered for an electrically idle interval during a third time phase, to conserve energy, as well as to allow magnetic forces to dissipate prior to a following reverse condition;

the second impulse current, which is polarized Oppositely o the first impulse current, delivered to set the valve into motion toward a closed state during a fourth time phase; and the second low current, which is polarized oppositely to the first low current, delivered to stabilize the valve in the closed state during a fifth time phase, the second low current having a lower amplitude than an amplitude of the first impulse current.

* * * * *